Nov. 17, 1925.

J. J. BARRY ET AL 1,561,503

BRINING MACHINE

Filed Feb. 26, 1924    2 Sheets-Sheet 2

Inventors
James J. Barry and
Clarence Birdseye.

By Mason Fenwick & Lawrence
Attorneys

Patented Nov. 17, 1925.

1,561,503

UNITED STATES PATENT OFFICE.

JAMES J. BARRY, OF NEW YORK, AND CLARENCE BIRDSEYE, OF YORKTOWN HEIGHTS, NEW YORK.

BRINING MACHINE.

Application filed February 26, 1924. Serial No. 695,292.

*To all whom it may concern:*

Be it known that we, JAMES J. BARRY and CLARENCE BIRDSEYE, citizens of the United States, residing at New York and Yorktown Heights, in the counties of Bronx and Westchester and State of New York, have invented certain new and useful Improvements in Brining Machines; and we do hereby declare the following to be a full, clear, and exact description of the invention, such as will enable others skilled in the art to which it appertains to make and use the same.

This invention relates to a machine for treating fish after the same have been cut open, it being the object of the invention to provide a machine for spraying the fish with brine to thoroughly cleanse the same.

Referring to the drawings wherein the embodiment of the invention is shown, Fig. 1 is a longitudinal vertical section through the improved machine.

Figure 1:
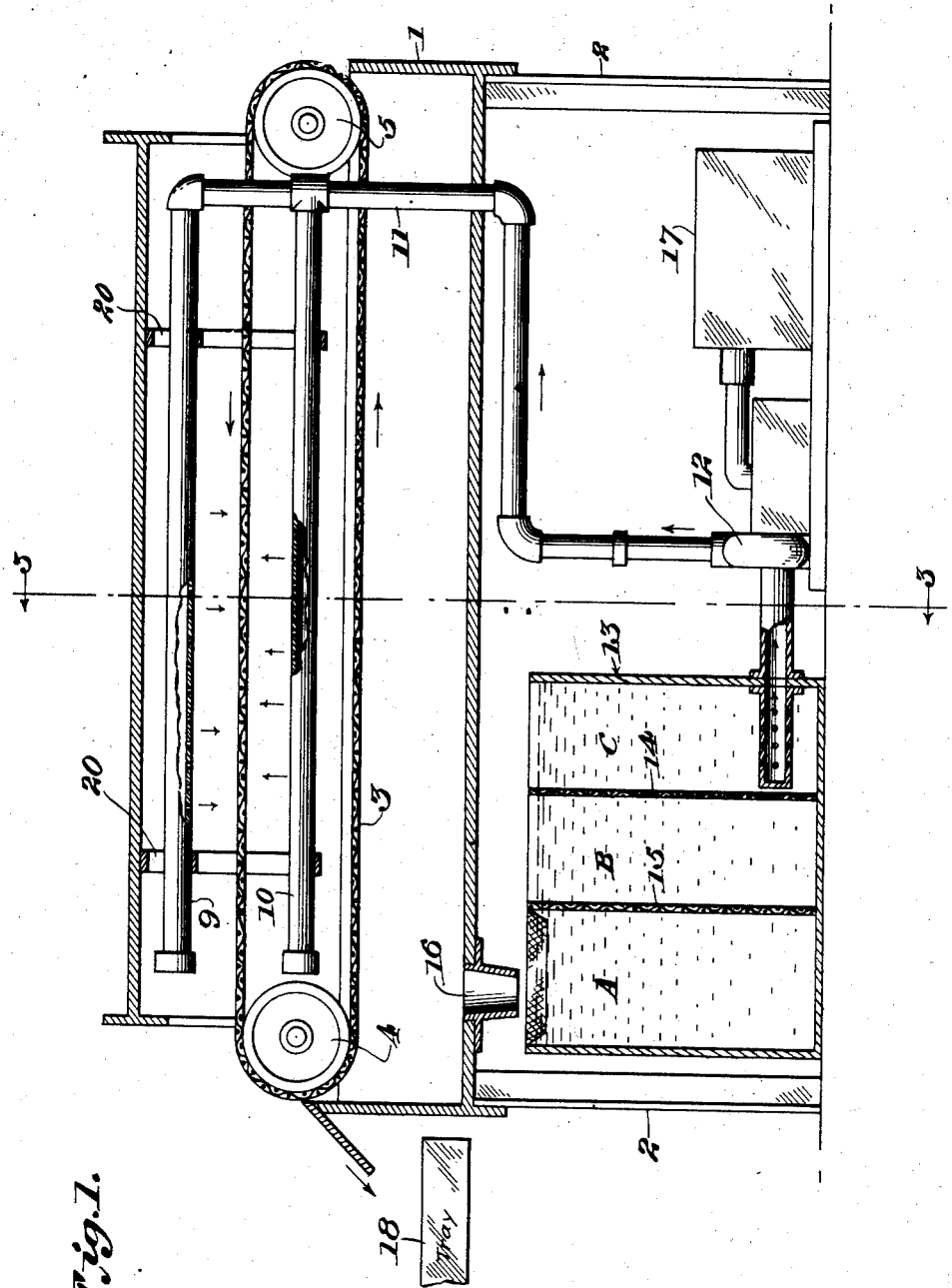
Figure 2:
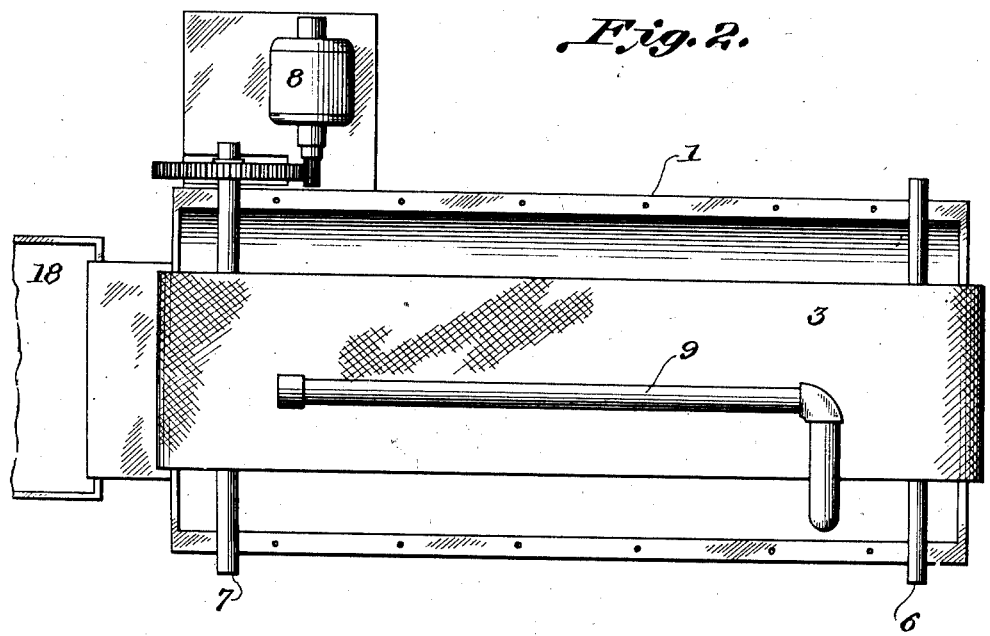
Fig. 2 is a plan thereof.
Figure 3:
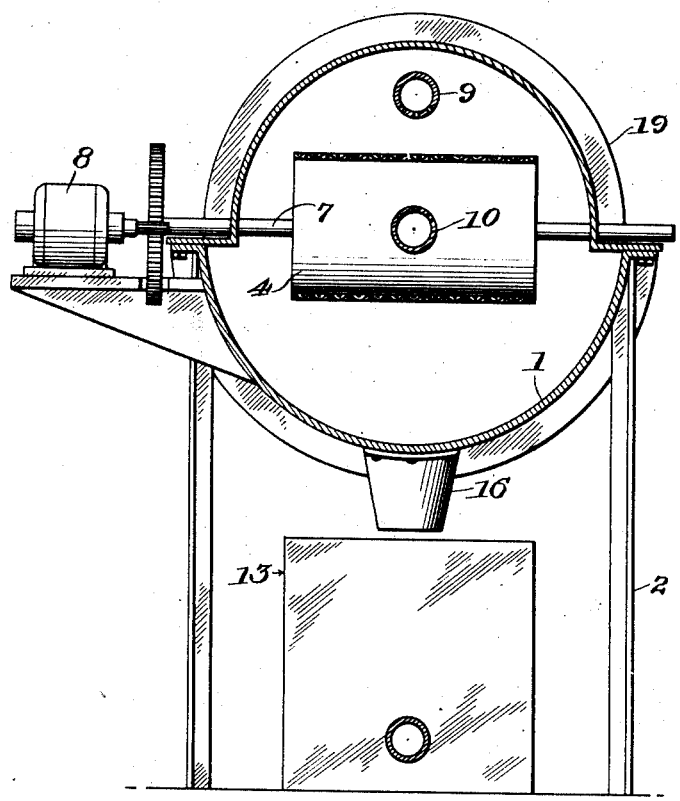
Fig. 3 is a section on line 3—3 of Fig. 1.

In the drawings, numeral 1 indicates a tank which is preferably semicircular in form, the same being supported upon suitable standards 2 at either end thereof. Disposed longitudinally of the tank is an endless wire mesh belt 3, the same being looped over pulleys 4 and 5 at the ends of the tank. Pulley 5 is supported on a suitable shaft 6 extending across the tank and pulley 4 is secured on a shaft 7 which likewise extends across the tank and is suitably geared to a driving motor 8.

Disposed on either side of the upper run of the belt 3 is a pair of pipes 9 and 10 connected to a common conduit 11 through which brine is pumped by a pump 12 from a tank generally indicated at 13, which tank is divided into three compartments by wire screens 14 and 15 vertically disposed therein. The first compartment indicated by letter A is disposed beneath an opening 16 at one end of the tank 1, said opening 16 serving as a discharge point for the brine which has been pumped over the fish in a manner hereinafter to be described. The compartment B is adapted to contain crystal salt and the partition 15 between the compartments A and B serves to prevent scales from the fish from passing into the compartment B. The compartment C is kept free from solid substances by the screen 14, and consequently only clear brine will be pumped by the pump 12 to the spraying pipes 9 and 10. It will be noted that the intake of the pump is located within the compartment C. The pump 12 is driven by a suitable motor 17.

The horizontally disposed pipes 9 and 10 are perforated on their sides adjacent the upper run of the belt 3, and consequently the brine will be directed from opposite directions onto the fish lying on said upper run of the belt.

The fish are placed upon the upper run of the belt 3 in any suitable manner, either manually or mechanically, on the end of the belt at the pulley 5 which is the entrance point to the machine. The fish are discharged from the upper run of the belt onto a tray of any suitable character indicated by reference numeral 18 from whence they may be removed by hand or otherwise.

The tank is preferably housed over by means of a semicylindrical housing 19 to prevent spraying of the brine to surrounding objects.

The pipes 9 and 10 are supported in any suitable manner as by brackets 20 depending from the housing 19.

While we have shown but a single pair of pipes arranged on either side of the upper run of the belt, it is to be understood that a plurality of such pipes may be provided if the same should be found desirable. Various changes in the details of construction may also be made without departing from the spirit of the invention.

What we claim is:

In combination, with a brine fish cleaning machine a horizontally disposed tank having an opening in its bottom, a horizontally disposed belt within said tank, a pair of pipes arranged on either side of the upper run of said belt, said pipes being perforated on their sides adjacent said upper run, a second tank arranged below the first-mentioned tank and into which the latter discharges, said last-mentioned tank being divided into a plurality of compartments, said compartments separated by wire screens, the first compartment being adapted to receive the brine as it comes from the fish, containing various impurities such as fish scales, the second compartment is adapted to contain crystal salt, while the third compartment is kept comparatively free from solid substances by means of the intervening screens and crystal salt, thereby providing a clear cleaning brine, and means for pumping the said brine from the last named compartment through the pipes.

In testimony whereof we affix our signatures.

JAMES J. BARRY.
CLARENCE BIRDSEYE.